US005932647A

United States Patent [19]

Schilling et al.

[11] Patent Number: 5,932,647

[45] **Date of Patent: *Aug. 3, 1999**

[54] WOOD GLUE POWDER

[75] Inventors: Bernd Schilling, Burghausen; Reiner Figge, Ampfing; Manfred Selig, Burghausen, all of Germany

[73] Assignee: Wacker - Chemie GmbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,179

[22] PCT Filed: Dec. 7, 1995

[86] PCT No.: PCT/EP95/04829

§ 371 Date: Jan. 22, 1997

§ 102(e) Date: Jan. 22, 1997

[87] PCT Pub. No.: WO96/17897

PCT Pub. Date: Jun. 13, 1996

[30] Foreign Application Priority Data

Dec. 8, 1994 [DE] Germany ............................ 44 43 738

[51] Int. Cl.[6] ...................................................... C08L 29/04

[52] U.S. Cl. ............................. 524/503; 428/511; 525/57

[58] Field of Search .................................... 524/503, 557; 525/57; 528/501

[56] References Cited

U.S. PATENT DOCUMENTS

| | | | |
|---|---|---|---|
| Re. 28,780 | 4/1976 | Bergmeister | 525/57 |
| 3,644,257 | 2/1972 | Nickerson | 524/503 |
| 4,278,727 | 7/1981 | Brabetz | 524/503 |
| 4,339,552 | 7/1982 | Lindemann | 524/503 |
| 4,405,747 | 9/1983 | Ehmann | 524/503 |
| 4,605,589 | 8/1986 | Orphanides | 524/557 |
| 4,735,986 | 4/1988 | Iacoviello | 524/503 |
| 5,296,532 | 3/1994 | Haerzschel | 528/501 |
| 5,306,749 | 4/1994 | Columbus | 524/503 |
| 5,434,216 | 7/1995 | Mudge | 524/503 |
| 5,473,013 | 12/1995 | Zeller | 525/57 |
| 5,567,750 | 10/1996 | Schulze | 524/503 |
| 5,599,870 | 2/1997 | Nakamae | 524/503 |

*Primary Examiner*—Paul R. Michl
*Attorney, Agent, or Firm*—Burgess, Ryan & Wayne

[57] ABSTRACT

A wood glue powder which is easily dispersible in water is provided having improved bond strength, thermal stability and rapid setting properties and is prepared by mixing aqueous dispersions, prepared by emulsion polymerization technique of:

a) from 70 to 90% by weight of one or more vinyl ester homopolymers or vinyl ester copolymers of vinyl esters of unbranched or branched alkylcarboxylic acids having 1 to 18 carbon atoms, with b) from 10 to 30% by weight of one or more fully hydrolyzed vinyl alcohol homopolymers or vinyl alcohol copolymers having a degree of hydrolysis of from 96 to 100 mol % and a Hoppler viscosity of from 2 to 15 mPa.s, measured in 4% strength aqueous solution, based in each case on the overall weight of the polymeric constituents a) and b), and if desired, with further additives and then spray drying the mixture.

11 Claims, No Drawings

WOOD GLUE POWDER

BACKGROUND OF THE INVENTION

FIELD OF THE INVENTION

The invention relates to a wood glue powder, processes for its preparation, and its use.

EP-A 311873 (U.S. Pat. No. 5,087,649) discloses pulverulent mixtures of starch and cellulose ether, comprising water-dispersible or water-soluble vinyl acetate polymers or vinyl alcohol polymers, for use as wallpaper pastes. The addition of the redispersible polyvinyl acetate powders is made in that case to reinforce the bonding strength. The process claimed indeed makes it possible to obtain adhesives whose bonding strength is sufficient for gluing wood; however, the requirement criteria to which a water-resistant wood adhesive For the interior sector is nowadays subject, especially for use as a furniture adhesive, are increasing, these criteria being high thermal stabilities and rapid setting in the compression process, in order to make it possible to carry out rapid machine bonding. Glue powders based on vinyl acetate homopolymers and/or water-soluble, partially hydrolyzed polyvinyl alcohols are inadequate in fulfilling these criteria.

JP-A 61-168681 (Derwent Abstract AN 86-241053) relates to pulverulent wood adhesives which are obtainable by spray drying polyvinyl acetate homopolymer dispersions which have been polymerized in the presence of partially hydrolyzed polyvinyl alcohol as protective colloid. To improve the bond strength, melamine-formaldehyde condensate is added to the powder. Powder mixtures of this kind do indeed form water-resistant bonds, but the addition of moisture-sensitive crosslinking agent renders their stability on storage and their blocking stability unsatisfactory. Furthermore, when polyvinyl acetate homopolymers are used it is necessary to add film-forming auxiliaries in order to attain the low minimum film-forming temperature of from 0 to 5° C. Which is required for the application.

DE-B 2214410 (U.S. Pat. No. 3,883,489) and DE-B 2614261 (GB-A 1569637) relate to processes for producing redispersible vinyl acetate/ethylene dispersion powders which are prepared by emulsion polymerization in the presence of partially hydrolyzed polyvinyl alcohol as a protective colloid followed by spray drying of the dispersion. The powders are described as being suitable binders for adhesives and coating compositions. Because of the content of ethylene in the polymer it is, admittedly, possible to dispense with the addition of film-forming auxiliaries; nevertheless, to improve their blocking stability the powders contain up to 30% by weight of antiblocking agent, leading to a drastic decrease in the bond strength. Furthermore, the thermal stability of ethylene-containing vinyl acetate copolymers, whose ethylene content is relatively high in order to reduce the minimum film-forming temperature, is very low indeed.

DE-A 1794123 (ZA-A 6805680) describes an adhesive dispersion for bonding ceramic materials which comprises vinyl acetate homopolymer and high molecular mass, fully hydrolyzed polyvinyl alcohol. In order to improve the adhesion properties it is recommended to add plasticizers, for example dibutyl phthalate. A disadvantage in this case is that when volatile plasticizers are used the plasticizer evaporates after processing. In the case of wood glues, which are employed primarily in the domestic sector, the emission of volatile compounds must be avoided. Furthermore, although these mixtures can be spray dried, the powders obtainable therewith are not redispersible owing to the poor water-solubility of the high molecular mass, fully hydrolyzed polyvinyl alcohols. This rules out their use as wood glue powders for the production of aqueous wood adhesives.

Against this background the object was to develop pulverulent adhesives for bonding wood, whose use in aqueous wood adhesives leads to water-resistant bonds of high thermal stability and with rapid setting properties.

Owing to the tightening of environmental regulations, especially those arising from what is known in Germany as the Packaging Ordinance, the intention is to provide a pulverulent wood adhesive which can be transported and packaged in easily disposable paper bags, rather than the bucket packs of liquid dispersion adhesives used to date, and need only be stirred together with water prior to application. For transportation of palletized, bagged product, however, the requirements placed on the blocking stability of wood glue powders are stringent, especially for export to countries with a hot climate. A further object, therefore, was to provide pulverulent adhesives which couple high blocking stability with a low or zero content of antiblocking agent and which exhibit outstanding redispersibility in water.

One reason why wood glue powders have not to date found application in the production of water-resistant bonds is that in order to attain high bond strengths at low temperatures it has been necessary to add volatile film-forming auxiliaries to the polyvinyl acetate-based dispersion adhesives produced from powders. An additional object, therefore, was to provide wood glue powders which when used in aqueous adhesive dispersions have the required low minimum film-forming temperature even without the addition of volatile film-forming auxiliaries.

SUMMARY OF THE INVENTION

The invention provides water-redispersible, blocking-stable wood glue powders having a minimum film-forming temperature of from 0 to 5° C., comprising a) from 70 to 90% by weight of one or more vinyl ester homopolymers or vinyl ester copolymers of vinyl esters of unbranched or branched alkylcarboxylic acids having 1 to 18 carbon atoms, and b) from 10 to 30% by weight of one or more fully hydrolyzed vinyl alcohol homopolymers or vinyl alcohol copolymers having a degree of hydrolysis of from 96 to 100 mol % and a Höppler viscosity of from 2 to 15 mpa.s, measured in 4% strength aqueous solution, based in each case on the overall weight of the polymeric constituents a) and b), obtainable by mixing aqueous dispersions, prepared by the emulsion polymerization technique, of the vinyl ester polymers a) with the vinyl alcohol polymers b) and, if desired, with further additives and then by spray drying the mixture.

DESCRIPTION OF THE PREFERRED EMBODIMENTS

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of $\alpha$-branched monocarboxylic acids having up to 10 carbon atoms, for example VeoVa9® or VeoVa10®, sold by the Shell Corporation. Vinyl acetate is particularly preferred.

The vinyl ester copolymers can if desired include from 1.0 to 65% by weight, based on the overall weight of the copolymer, of vinyl aromatic compounds such as styrene and/or vinyl halides such as vinyl chloride and/or acrylic esters and/or methacrylic esters of alcohols having 1 to 10 carbon atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate and/or ethylenically unsaturated dicarboxylic esters and/or derivatives thereof, such as diisopropyl fumarate, the dimethyl, methyl t-butyl, di-n-butyl, di-t-butyl and diethyl esters of maleic acid and fumaric acid, or maleic anhydride. If desired, from 1 to 10% by weight of $\alpha$-olefins such as ethylene may be present. Preference is given to copolymers containing comonomers which raise the hardness of the polymer, i.e. Which lead to copolymers having a relatively high Tg. Examples of these are VeoVa9$^R$ and vinyl chloride. The content of comonomers which reduce the hardness of the vinyl ester copolymers, examples being ethylene and n-butyl acrylate, should preferably be not more than 10% by weight, based on the overall weight of the copolymer.

If desired, the vinyl ester homo- or copolymers also include from 0.05 to 10.0% by weight, based on the overall weight of the comonomer mixture, of auxiliary monomers from the group consisting of ethylenically unsaturated carboxylic acids, preferably acrylic acid or methacrylic acid; from the group consisting of ethylenically unsaturated carboxamides, preferably acrylamide; from the group consisting of ethylenically unsaturated sulfonic acids and their salts, preferably vinylsulfonic acid, 2-acrylamido-2-methyl propanesulfonic acid; and/or from the group consisting of polyethylenically unsaturated comonomers, for example divinyl adipate, diallyl maleate, allyl methacrylate or triallyl cyanurate. Other suitable auxiliary monomers are crosslinking monomers, for example acrylamidoglycolic acid (AGA), methylacrylamidoglycolic acid methyl ester (MAGME), N-methylolacrylamide (NMAA), N-methylolmethacrylamide, allyl N-methylolcarbamate, alkyl ethers, such as the isobutoxy ether, or esters of N-methylolacrylamide, of N-methylolmethacrylamide or of allyl N-methylolcarbamate.

Preferred polymers a) are vinyl acetate homopolymers, vinyl acetate-ethylene copolymers having an ethylene content of from 1 to 10% by weight; vinyl acetate copolymers with vinyl esters of $C_3$- to $C_{10}$-alkylcarboxylic acids and a vinyl acetate content of from 35 to 90% by weight for example vinyl acetate VeoVa9® vinyl acetate VeoVa10®, vinyl acetate-vinyl laurate VeoVa9® (VeoVa10®) copolymers. Preference is also given to vinyl acetate homopolymers and vinyl acetate copolymers of the compositions just described which additionally include from 0.05 to 5.0% by weight of N-methylolacrylamide, N-methylolmethacrylamide or the N-alkoxymethyl derivatives thereof, such as N-(isobutoxymethyl) (meth) acrylamide or N-(n-butoxymethyl) (meth)acrylamide. The percentages by weight relate in each case to the overall weight or the polymers.

The vinyl ester homo- or copolymers are prepared by the emulsion polymerization technique. The polymerization can be carried out batchwise or continuously and with or without the use of seed latices, with all or individual constituents of the reaction mixture being included in the initial charge, or with some of the constituents, or of the individual constituents, of the reaction mixture being included in the initial charge and some being metered in subsequently, or by the metered addition method without an initial charge. All metered additions are made preferably at the same rate at which the respective component is consumed. In the case of copolymerization with ethylene it is preferred to operate at a pressure of from 20 to 40 bar abs.

The polymerization is preferably carried out in a temperature range from 40° C. to 80° C. and is initiated with the methods customarily employed for emulsion polymerization. Initiation takes place by means of the customary, water-soluble free-radical initiators, which are preferably employed in quantities of from 0.01 to 1.0% by weight, based on the overall weight of the monomers. Examples of such initiators are ammonium persulfate and potassium persulfate, alkyl hydroperoxides, such as tert-butyl hydroperoxide; hydrogen peroxide. If desired it is also possible to combine the abovementioned free-radical initiators in a known manner with from 0.01 to 0.5% by weight, based on the overall weight of the monomers, of reducing agents. Suitable examples are formaldehyde sulfoxylate salts, sodium bisulfite or ascorbic acid. In the case of redox initiation, preferably one or both redox catalyst components are metered in during the polymerization.

Dispersants which can be employed are all those emulsifiers customarily used in the case of emulsion polymerization. It is preferred to employ from 1 to 4% by weight, based on the overall weight of the monomers, of emulsifier. Suitable examples are anionic surfactants, such as alkyl sulfates having a chain length of 8 to 18 carbon atoms, alkyl and alkylaryl ether sulfates having 8 to 18 carbon atoms in the hydrophobic radical and up to 40 ethylene or propylene oxide units, alkyl- or alkylaryl sulfonates having 8 to 18 carbon atoms, esters and monoesters of sulfosuccinic acid with monohydric alcohols or alkylphenols. Examples of suitable nonionic surfactants are alkyl polyglycol ethers or alkylaryl polyglycol ethers having 8 to 40 ethylene oxide units.

It is possible if desired to employ protective colloids, preferably in quantities of up to 4% by weight based on the overall weight of the monomers. Examples of such compounds are vinyl alcohol-vinyl acetate copolymers having a content of from 70 to 85 mol % of vinyl alcohol units, polyvinylpyrrolidones having a molecular weight of from 5000 to 400,000, and hydroxyethylcelluloses having a degree of substitution ranging from 1.5 to 3.

The pH range desired for the polymerization which is generally between 3 and 7, can be established in a known manner by means of acids, bases or customary buffer salts, such as alkali metal phosphates or alkali metal carbonates. For establishing molecular weight it is possible curing the polymerization to add the commonly used regulators, for example mercaptans, aldehydes and chlorinated hydrocarbons.

The solids content of the aqueous dispersions is preferably from 30 to 65% by weight.

Suitable fully hydrolyzed vinyl alcohol homo- or copolymers are those having a degree of hydrolysis of from 96 to 100 mol % and a Höppler viscosity of from 2 to 15 mPa.s, measured in 4% strength aqueous solution. Preference is given to vinyl alcohol homopolymers or vinyl alcohol copolymers each having a degree of hydrolysis of from 98 to 100 mol % and a Höppler viscosity of from 2 to 10 mPa.s, measured in 4% strength aqueous solution at 20° C.

Preferred vinyl alcohol copolymers are those which in addition to vinyl alcohol units include from 0.5 to 10% by weight, preferably from 1 to 5% by weight, based in each case on the overall weight of the copolymer, of 1-methylvinyl alcohol units. Those preferred most of all are vinyl alcohol-1-methylvinyl alcohol copolymers having a degree of hydrolysis of from 98 to 100 mol %.

The vinyl alcohol homo- and copolymers specified are commercially available and/or can be obtained in a manner known to the skilled worker, by hydrolysis or alcoholysis of the corresponding vinyl acetate homo- and copolymers.

To prepare the water-redispersible, blocking-stable wood glue powders, a vinyl ester polymer is employed and an aqueous dispersion having a solids content of preferably from 30 to 60% by weight. The vinyl alcohol polymer b), in the form of a solid or of an aqueous solution, is admixed to this dispersion. Admixing it in the form of an aqueous solution is preferred, with the solids content of the solution being preferably up to 20% by weight in the case of polyvinyl alcohols of low viscosity (from 2 to 6 mPa.s) and preferably up to 10% by weight in the case of polyvinyl alcohols of higher viscosity (from 6 to 15 mPa.s). If desired, water too can be added in order to adjust the viscosity. These mixing operations may take place in any desired sequence using the customary mixing apparatus. The mixing ratio is chosen so that the dry powder contains from 70 to 90% by weight, preferably from 80 to 85% by weight, of vinyl ester polymer a) and from 10 to 30% by weight, preferably from 15 to 20% by weight, of vinyl alcohol polymer b), based in each case on the overall weight of the polymeric constituents a) and b).

The mixture is subsequently spray dried, in which case spraying can be carried out using single-substance nozzles, multi-substance nozzles or using a disk in a heated or unheated stream of dry gas. In general, temperatures above 250° C. are not employed. The optimum temperature of the dry gas can be determined in a few experiments; in many cases temperatures above 60° C. have proven particularly appropriate.

Additives, for example antiblocking agents or hardeners, can be added if desired to the powder prior to, during or after spray drying.

To enhance the storage properties, an antiblocking (anticaking agent) can be added to the resulting powder in a quantity of not more than 40% by weight, preferably not more than 5% by weight, based on the overall weight of polymeric constituents. Examples of antiblocking agents are finely ground aluminum silicates, kieselguhr, colloidal silica gel, pyrogenic silicic acid, precipitated silicic acid, microsilica, light spar, kaolin, talc, cements, diatomaceous earth, calcium carbonate, and magnesium hydrosilicate. Reference is given to fillers having a neutral to slightly acidic character, for example light spar.

Antiblocking agents are generally employed only when the demands on the adhesive as far as bond strength and optical properties are concerned are relatively low. One example of this is the use of the wood glue powder in adhesive dispersions for bonding parquet flooring. Preference, however, is given to wood glue powders without antiblocking agents, since the addition of antiblocking agent leads, when the adhesive is used, to visible clouding of the joint.

For specific applications, for example where high hot-water resistance of the bond is required (performance group D3 and D4 of DIN Standard EN 204), hardeners or crosslinking agents as well can be added to the wood glue powder. Examples of hardeners are acidic metal salt hardeners, such as $AlCl_3$, $FeCl_3$, $Cr(NO_3)_3$. Examples of crosslinking agents are polyisocyanates or formaldehyde-urea resins and formaldehyde-phenol resins. The greatest preference, however, is given to embodiments in which no antiblocking agent nor hardener nor crosslinking agent nor film-forming auxiliary nor thickener is added to the powder.

The present invention provides a preformulated wood glue powder which need only be stirred together with water prior to application. To prepare the aqueous adhesive dispersion, the wood glue powder is redispersed in water. Normally, a solids content of from 45 to 55% by weight is established. In the course of blending the aqueous adhesive dispersion it is also possible, if desired, to add other additives, such as antiblocking agents, as well. In contrast to the prior art, where aqueous adhesive dispersions having a viscosity especially adapted to the respective area of application have beer used, it is possible when using the novel wood glue powder in aqueous adhesive dispersions to establish any desired viscosity by way of the quantity of water added. Aqueous adhesive dispersions based on the wood glue powder are preferably used with a Brookfield viscosity (20 rpm) of from 10,000 to 50,000 mPa.s.

The adhesive dispersions produced with the wood glue powder are suitable in particular for the wood-to-wood bonding of non-load-bearing wooden components, and in this application they meet performance class "D2" of the European Standard EN 204. A further area of application is the bonding of wood with absorbent substrates such as screed flooring, especially parquet bonding. The application of the aqueous adhesive to the substrates to be bonded and the bonding thereof, with or without the application or pressure, takes place in a manner familiar to the skilled worker and requires no more detailed description.

In contrast to wood adhesives known to date, the novel wood glue powder has the following advantages:

In comparison with conventional wood adhesives based on aqueous dispersions, the novel wood glue powder is substantially easier to transport and to package owing to the lack of a water content. Unlike aqueous wood glues, the addition or preservative is unnecessary. The storage stability is substantially improved, since there is no danger either of coagulation of the binder at low temperature or of premature crosslinking when N-methylol-functional vinyl ester polymers are used.

Above all, however, the use of the novel wood glue powder in aqueous dispersion provides for the first time adhesives based on polyvinyl acetate/polyvinyl alcohol which have a high solids content, of 50% or more, with a proportion of up to 30% by weight of fully hydrolyzed polyvinyl alcohol. Before now, polyvinyl acetate/polyvinyl alcohol dispersions of such high concentration were not obtainable by blending very high-solids polyvinyl acetate dispersions with highly concentrated aqueous solutions of fully hydrolyzed polyvinyl alcohol, since aqueous solutions of fully hydrolyzed polyvinyl alcohol, owing to their poor solubility, can be dealt with on the industrial scale only up to a concentration of not more than 20% by weight.

Owing to the high proportion a fully hydrolyzed, low-viscosity polyvinyl alcohol or vinyl alcohol copolymer, redispersible adhesive powders are obtained which have the required blocking stability even without the addition of antiblocking agents. A consequence of this is that the bond strength of the novel wood glue powders is markedly improved in comparison to that of conventional pulverulent adhesives which include antiblocking agents.

Owing to the high proportion of fully hydrolyzed, low-viscosity polyvinyl alcohol or vinyl alcohol copolymer, the minimum film-forming temperature of the adhesive is reduced, even without the addition of volatile organic film-forming auxiliaries, to the temperature range from 0 to 5° C. as required by practice. By this means the novel wood glue powder constitutes a solution to the avoidance of volatile organic film-forming auxiliaries when aqueous vinyl acetate homopolymer adhesives are employed, and, as a result of the spray-drying step, also offers the possibility of bringing other volatile organic compounds, such as formaldehyde and residual monomer, to the technologically feasible limit.

The examples which follow are intended to illustrate the invention in more detail:

Preparation of the wood glue powders

EXAMPLE 1

10kg of an aqueous vinyl acetate homopolymer dispersion with a solids content of 60% by weight were mixed thoroughly with 10 kg of a 20% strength aqueous solution of a vinyl alcohol copolymer, prepared from 97.5% by weight of vinyl acetate and 2.5% by weight of isopropenyl acetate and subsequent hydrolysis, having a degree of hydrolysis of 98.5% and a Höppler viscosity of the vinyl alcohol copolymer of 4 mPa.s. The mixture was sprayed through a dual-substance nozzle. The spraying medium used was air pre-compressed to 4 bar; the drops formed were dried in cocurrent with air heated at 125° C. A powder was obtained containing 75% by weight of polyvinyl acetate and 25% by weight of vinyl alcohol copolymer. The MFT of the powder was 0° C.

EXAMPLE 2

The procedure of Example 1 was repeated using as polyvinyl ester component a) 10 kg of an aqueous vinyl acetate copolymer dispersion containing 96% by weight of vinyl acetate units and 4.0% by weight of N-methylolacrylamide units and having a solids content of 52% by weight. A powder was obtained containing 72% by weight of VAc/NMA copolymer and 28% by weight of vinyl alcohol copolymer. The MFT of the powder was 2° C.

EXAMPLE 3

The procedure of Example 1 was repeated using as polyvinyl ester component a) 10 kg of an aqueous vinyl acetate copolymer dispersion containing 65% by weight of vinyl acetate units, 30% by weight of VeoVa9$^R$ units and 5.0% by weight of N-methylolacrylamide units and having a solids content of 50% by weight. A powder was obtained containing 71% by weight of VAc/VeoVa9/NMA copolymer and 29% by weight or vinyl alcohol copolymer. The MFT of the powder was 2° C.

EXAMPLE 4

The procedure of Example 1 was repeated using as polyvinyl alcohol component b) 10 kg of a 20% strength aqueous solution of a polyvinyl alcohol having a degree of hydrolysis of 98.0% and a Hoppler viscosity of 3 mPa.s. A powder was obtained containing 75% by weight of polyvinyl acetate and 25% by weight of polyvinyl alcohol. The MFT of the powder was 0° C.

EXAMPLE 5

The procedure of Example 4 was repeated, and following the drying of the powder 1.2 kg of the commercially available antiblocking agent (light spar) were added. The result was a powder containing 6 kg of vinyl acetate homopolymer, 2 kg of fully hydrolyzed polyvinyl alcohol and 1.2 kg of antiblocking agent. The MFT of the powder was 4° C.

Comparison Example 1

A vinyl acetate homopolymer dispersion having a solids content of 50% by weight, which had been prepared in the presence of partially hydrolyzed polyvinyl alcohol by emulsion polymerization, having a polyvinyl acetate content of 90% by weight and 10% by weight of polyvinyl alcohol and having a degree of hydrolysis of 85% and a Höppler viscosity of 20 mPa.s, was dried by a procedure similar to that of Example 1. A redispersible powder was obtained having a MFT of 18° C.

Performance testing

The powders from Example 1 and Comparison Example 1 were redispersed in water, and in each case adhesive dispersions having a solids content of 50% by weight were prepared.

The adhesive dispersions were used to test the bond strength in accordance with DIN EN 204/205 and the thermal stability of the bonds in accordance with WATT 91, and also the setting properties.

Test methods

Bond strength in accordance with DIN EN 204/205:

The specimens were produced in accordance with DIN EN 205. For this purpose pairs of beechwood panels, each 5 mm thick, 130 mm wide and 600 mm long, were bonded to one another with the adhesive dispersion to be tested under a pressure distributed uniformly over the bond area and were stored in accordance with DIN EN 204. For testing for allocation to performance group D1, the specimens, after gluing, were stored under standard climatic conditions (23° C. 65% atmospheric humidity) for 7 days.

For testing for allocation to performance group D2, the specimens, after gluing, were stored under standard atmospheric conditions (23° C., 65% atmospheric humidity) for 7 days, then in cold water at 23° C. for 3 hours, and finally for 7 days more under standard climatic conditions.

For testing for allocation to performance group D3, the specimens, after gluing, were stored under standard climatic conditions (23° C., 65% atmospheric humidity) for 7 days and then stored in cold water at 23° C. for 4 days.

Following storage, the bonded panels were divided into test specimens each measuring 150 mm in length, and these test specimens were used to determine the bond strength in the tensile shear test, in which the bonded specimens were pulled apart using a tensile testing machine at a pulling rate of 50 mm/min and were stressed until they broke. Or fracture, the maximum force $F_{max}$ which occurred at that point was determined. The bond strength T is calculated in accordance with DIN EN 205 from $T=F_{max}/A$, where A is the bonded test area in $mm^2$.

The results of testing for bond strength are compiled in Table 1.

Testing for thermal stability in accordance with WATT 91:

As test specimens, pairs of beechwood panels each 5 mm thick, 125 mm wide and 325 mm long were bonded to one another using the adhesive dispersion tested, under a pressure distributed uniformly over the bond area. After the test specimens had been prepared they were stored at a temperature of 80° C. in an oven preheated to 80° C. Directly following hot storage, the thermal stability was determined in the tensile shear test on the lines of DIN EN 205, in which the bonded test specimens were pulled apart using a tensile testing machine at a pulling speed of 50 mm/min and were stressed until they broke. On fracture, the maximum force $F_{max}$ which occurred at that point was determined. The thermal stability $\tau$ is calculated from $\tau=F_{max}/A$, where A is the bonded test area in $mm^2$.

The results of the testing for thermal stability are compiled in Table 1.

Testing of the setting properties:

In a manner similar to the procedure for testing the bond strength, pairs of oak panels each 5 mm thick, 130 mm wide and 150 mm long were bonded to one another using the adhesive dispersions to be tested, with a pressure which was distributed uniformly over the bond area, and the bond strength was determined in the tensile shear test after a setting time 2.5 minutes, 5 minutes, 10 minutes and 20 minutes, in which the bonded test specimens were pulled apart using a tensile testing machine at a pulling speed of 50 mm/min and were stressed until they broke. On fracture, the maximum force $F_{max}$ which occurred at that point was determined, and was used in turn to determine the bond strength at setting time t by $T_t = F_{max}/A$, where A is the bonded test area in $mm^2$.

The results of testing for setting properties are compiled in Table 1.

TABLE 1

| Example | Example 1 | Comparison Example 1 |
|---|---|---|
| Bond strength ($N/mm^2$): | | |
| D1 value | 10.3 | 8.0 |
| D2 value | 10.3 | 8.1 |
| D3 value | 0.5 | 0.0 |
| Thermal stability ($N/mm^2$): | | |
| $\tau$ | 9.2 | 4.8 |
| Setting properties ($N/mm^2$): | | |
| $T_t$ at 2.5 minutes | 3.6 | 2.3 |
| $T_t$ at 5 minutes | 6.2 | 4.4 |
| $T_t$ at 10 minutes | 8.5 | 6.5 |
| $T_t$ at 20 minutes | 9.2 | 7.9 |

We claim:

1. A process for bonding wood components which comprises:

(I) forming a mixture which is free of film forming additives and consists of water and a water-redispersible, blocking-stable wood glue powder having a minimum film-forming temperature of from 0 to 5° C. and wherein the wood glue powder is dispersed in water, in an amount such that a Brookfield viscosity (20 rpm) of from 10,000 to 50,000 mPa.s is obtained, said powder consisting of:

a) from 70 to 90% by weight of one or more vinyl ester homopolymers or vinyl ester copolymers of vinyl esters of unbranched or branched alkylcarboxylic acids having 1 to 18 carbon atoms, and b) from 10 to 30% by weight of one or more fully hydrolyzed vinyl alcohol homopolymers or vinyl alcohol copolymers having a degree of hydrolysis of from 96 to 100 mol % and a Höppler viscosity of from 2 to 15 mPa.s, measured in a 4% strength aqueous solution, based in each case on the overall weight of the polymeric constituents a) and b), obtainable by mixing aqueous dispersions prepared by the emulsion polymerization technique of the vinyl ester polymers a) with the vinyl alcohol polymers b) and then spray drying;

(II) contacting at least one of the wood components with the wood glue mixture of (I) and (III) affixing another component thereto.

2. A process as claimed in claim 1, wherein polymer a) comprises vinyl acetate homopolymers, vinyl acetate copolymers with vinyl esters of $C_3$- to $C_{10}$-alkylcarboxylic acids and a vinyl acetate content of from 35 to 90% by weight, and wherein these homo- or copolymers optionally containing from 0.05 to 5.0% by weight of N-methylolacrylamide, N-methylolmethacrylamide or the N-alkoxymethyl derivatives thereof.

3. A process as claimed in claim 1, wherein polymer b) comprises vinyl alcohol homopolymers or vinyl alcohol copolymers having from 0.5 to 10% by weight of 1-methylvinyl alcohol units, whose degree of hydrolysis in each case is from 98 to 100 mol % and whose Höppler viscosity in each case is from 2 to 10 mPa.s.

4. The process as claimed in claim 1, which comprises employing the vinyl ester polymer a) as an aqueous dispersion having a solids content of 30 to 60% by weight, and admixing to this dispersion the vinyl alcohol polymer b) in the form of a solid an aqueous solution, with a solids content of the solution of up to 20% by weight, and subsequently spray-drying this mixture.

5. The process of claim 1 wherein the wood glue powder is redispersed, in water, in an amount such that an aqueous adhesive dispersion having a solids content of from 45 to 55% by weight is obtained.

6. The process of claim 1 wherein the wood components are non-load-bearing components.

7. The process of claim 1 for bonding wood to absorbent substrates which comprises contacting at least one of the wood or substrate with the wood glue and affixing the wood to the substrates.

8. The process of claim 1 wherein the wood is parquet flooring.

9. The process of claim 1 wherein the powder comprises N-(isobutoxymethyl) (meth)acrylamide or N-(n-butoxymethyl) (meth)acrylamide.

10. The process of claim 1 wherein additives are added prior to, during and after drying.

11. The process of claim 1 wherein when high hot water resistance of the bond is required, hardeners and crosslinking agents are added to the wood glue powder.

* * * * *